United States Patent [19]

Lindquist

[11] 4,170,277

[45] Oct. 9, 1979

[54] LUBRICATING FITTING FOR A CONVEYOR TRACK WHEEL

[76] Inventor: Steven G. Lindquist, 3140 Clemens Rd., Clarkston, Wash. 99403

[21] Appl. No.: 864,239

[22] Filed: Dec. 27, 1977

[51] Int. Cl.² ............................................. F16N 3/10
[52] U.S. Cl. .............................. 184/105 C; 184/15 A
[58] Field of Search ............ 184/105 C, 105 B, 15 R, 184/15 A, 61

[56] References Cited

U.S. PATENT DOCUMENTS

| | | | |
|---|---|---|---|
| 2,003,709 | 6/1935 | Eisenhauer et al. | 184/105 C |
| 3,187,840 | 6/1965 | Williamson | 184/105 C X |
| 3,554,324 | 1/1971 | Watley et al. | 184/105 C |
| 4,101,002 | 7/1978 | Almasy | 184/15 B |

FOREIGN PATENT DOCUMENTS 259965  6/1965  Australia ............................. 184/105 C

*Primary Examiner*—David H. Brown
*Attorney, Agent, or Firm*—Wells, St. John & Roberts

[57] ABSTRACT

A lubricating fitting for lubricating a wheel while mounted in a partially enclosed conveyor track channel. The channel receives the wheel with a confined space existing between a back wall of the track channel and the hub of the wheel. The lubricating fitting includes a section with a slender profile to slide into the confined space facing the wheel hub. The fitting includes a resilient wall that is expandable outward to form a grease seal between the fitting and the wheel. A dispensing orifice is provided to enable grease to flow from the fitting into the wheel bearing.

8 Claims, 5 Drawing Figures

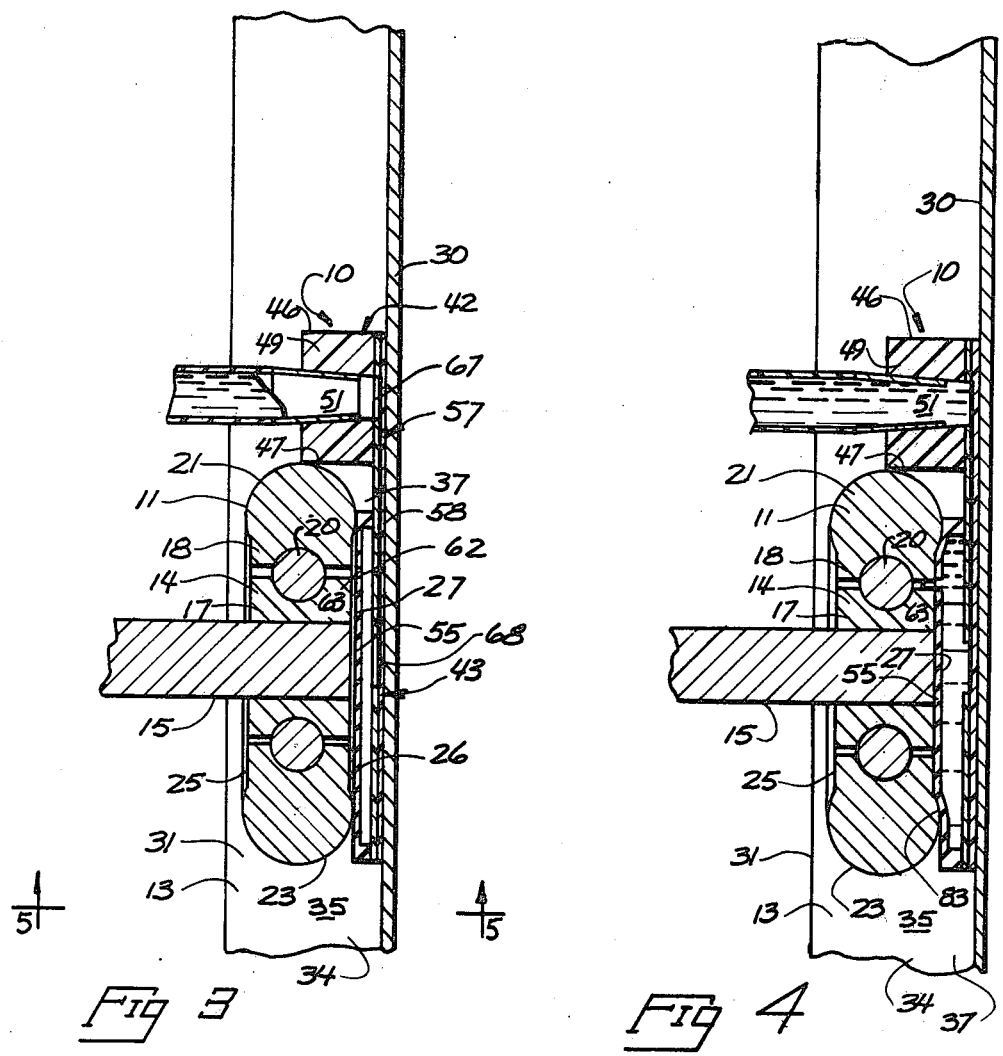
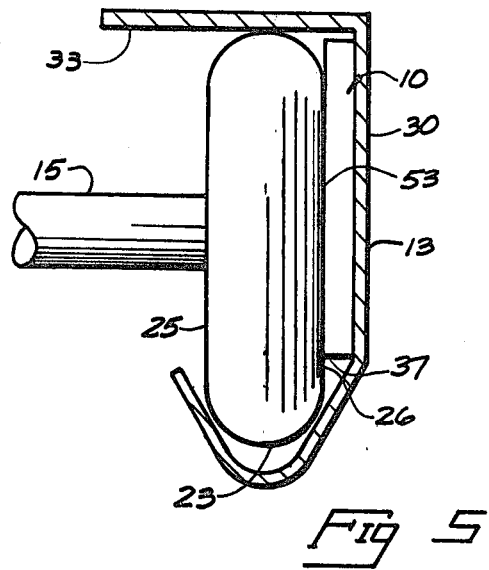

LUBRICATING FITTING FOR A CONVEYOR TRACK WHEEL

BACKGROUND OF THE INVENTION

This invention relates to devices for applying lubricating fluids to wheel bearings and more particularly to lubricating fittings for applying lubricating fluids to remote bearings of conveyor track wheels that ride in a partially enclosed conveyor track channel.

Many article conveyors, such as overhead door tracks, have wheels that ride in partially enclosed track channels. It is very difficult to obtain access to the conveyor track wheels to lubricate the wheel bearings without disassembling the conveyor system. Consequently, it frequently takes approximately an hour or more for a person to adequately lubricate the bearings of an overhead door system. Generally the conveyor tracks are substantially "C" shaped with the wheel hub being hidden or substantially inaccessible.

One of the principal objects of this invention is to provide a unique lubricating fitting that may be connected to a manual lubricating device, such as a grease gun, for accurately and efficiently applying lubricating fluid to the bearings of wheels that are mounted in partially enclosed conveyor tracks.

A further object of this invention is to provide very inexpensive lubricating fittings for attaching to a manual lubricating device such as a grease gun in which the fitting may be inexpensively produced for accurately applying grease to a conveyor wheel bearing without a substantial loss of grease.

These and other objects and advantages of this invention will become apparent upon reading the following detailed description of a preferred embodiment.

BRIEF DESCRIPTION OF THE DRAWINGS

A preferred embodiment of this invention is illustrated in the accompanying drawings, in which:

FIG. 3 is a longitudinal cross-sectional view of a conveyor track showing a conveyor wheel mounted therein with the lubricating fitting being positioned for applying lubricating fluid to the wheel bearing;

FIG. 4 is a longitudinal cross-sectional view similar to FIG. 3 except showing the fitting device applying lubricating fluid to the wheel bearing; and FIG. 5 is a vertical cross-sectional view of the conveyor track and conveyor wheel taken along line 5—5 in FIG. 3 further illustrating the positioning of the lubricating fitting with respect to the channel mounted wheel.

DETAILED DESCRIPTION OF A PREFERRED EMBODIMENT

Figure 1:
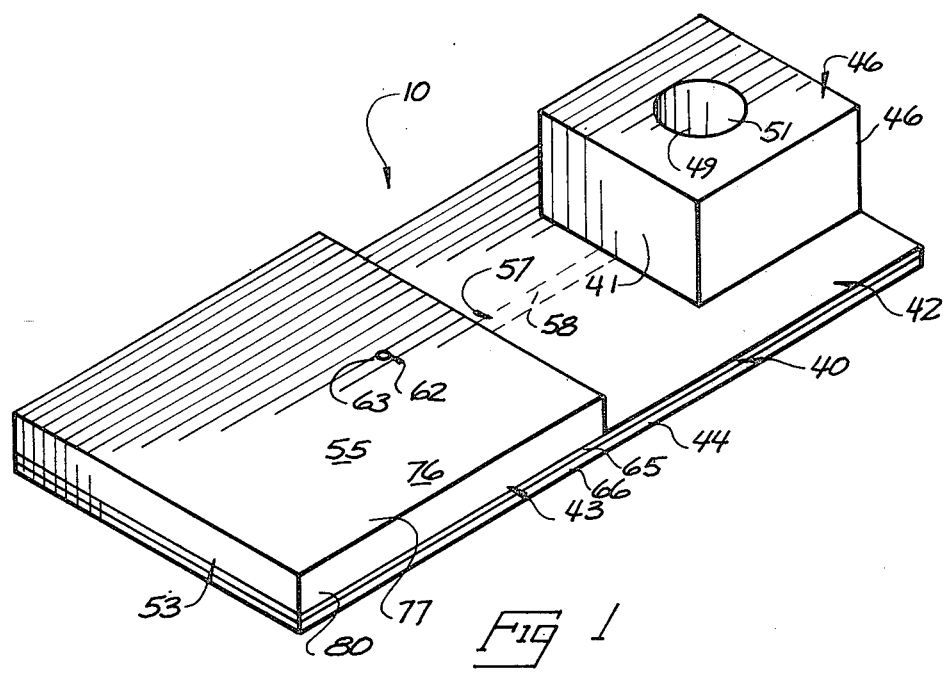
FIG. 1 is an isometric view of the subject lubricating fitting showing a preferred embodiment.

Referring now in detail to the drawings, there is illustrated in FIGS. 1-5 a lubricating fitting generally designated with the numeral 10 for applying lubricating fluid, such as grease, to the bearing of a conveyor wheel 11. Wheel 11 is partially enclosed in a longitudinal track channel 13. Generally the track channel 13 is substantially "C" or "L" shaped. Track channels of this type are frequently utilized in article conveying systems such as overhead door systems.

The conveyor wheel 11 includes a rolling bearing 14 (FIGS. 3 and 4) that is mounted on a wheel axle 15 for supporting the wheel for rotation about an axis defined by the axle 15. The axle 15 is connected directly or indirectly to an article being conveyed such as a door in an overhead door system or to other types of articles. The conveyor system may include numerous wheels 11 that are longitudinally spaced in the track channel in which several wheels 11 substantially support a single article. Other types of systems utilize a single wheel 11 for supporting a single article.

A typical bearing 14 includes an inner race 17 that is affixed to the axle 15. The outer race 18 is radially spaced from the inner race 17 for housing rolling elements 20 such as balls or rollers. Frequently the bearing 14 is formed as an integral part of the wheel with the outer race 17 being integral with the wheel rim 21. The wheel 21 has a wheel peripheral surface 23 that rolls in the track channel 13. The wheel 11 has an inside 25 that faces outward of the "C" shaped channel 13. The wheel 11 has an opposite side or outside 26 that faces into the track channel 13 and includes a wheel hub 27.

The track channel 13 includes a back wall 30 that is opposite the outside 26 of the wheel 11. The axle 15 projects through an open face 31 of the "C" shaped channel 13. The channel 13 further includes a top flange or wall 33 (FIG. 5) that extends from the back wall 30 over and above the wheel 11. The channel 13 further has a bottom flange or wall 34 that extends transversely from the back wall 30 under the wheel 11 to receive the wheel 11 in a wheel groove 35 that confines the wheel to a particular pathway in the channel 13 and causes the wheel 11 to move in the track channel without rubbing or engaging the back wall 30.

Groove 35 positions the wheel 11 slightly spaced from the back wall 11 defining a confined space 37 of limited access between the outside 26 of the wheel 11 and the back wall 30. As illustrated in FIG. 5, the confined space 37 has a width dimension that is normally slightly less than the diameter of the wheel 11. The confined space 37 includes a thickness dimension distance between outside 26 and wall 30 that is quite narrow making it very difficult to have access to the bearing 14 for lubricating the bearing 14 from the outside 26.

The lubricating fitting 10 is intended to efficiently apply lubricating fluid such as grease to the bearing 14 from the outside 26 adjacent the hub 27 as illustrated in FIGS. 3-5. The lubricating fitting 10 includes a body 40 (FIG. 1-5) having at least a portion thereof with a slender profile that is capable of being inserted into the interior of the track channel 13 with such slender portion being slidable into the confined space 37 between the outside 26 of the wheel 11 and the back wall 30 as illustrated in FIGS. 3-5. The lubricating fitting 10 includes a lubricating supply section 42 (FIG. 1) and a lubrication application section 43. The lubrication application section 43 has a slender profile to enable the section 43 to be inserted into the confined space 37 for applying lubricating fluid, such as grease, to the bearing 14 from the outside 26. The sections 42 and 43 include a common base 44 that bears against the back wall 30.

The lubrication supply section 42 includes an enlarged portion 46 that is attachable to a lubricating fluid supply, such as a grease gun (not shown). The enlarged portion 46 includes a shoulder 47 that is capable of engaging the peripheral surface 23 when the application section 43 is located in the confined space 37. The enlarged portion 46 has a connector element 49 for connecting the fitting 10 to a lubricating fluid source such as a grease gun. The connecting element 49 has an internal source cavity 51 for receiving grease under pressure from the grease source.

The lubrication application section 43 includes an inflatable cavity 53 that includes a resilient wall 55 that may be expanded outward from the base 44 when fluid pressure is applied thereto. The lubricating fitting 10 further includes a fluid lubrication communicating means 57 that extends between the sections 42 and 43 and more particularly between the source cavity 51 and the inflatable cavity 53 for enabling lubricating fluid to flow from the section 42 into the inflatable cavity 53. Communicating means 57 more specifically includes a passageway 58 that extends between the source cavity 51 and the inflatable cavity 53.

The lubricating fitting 10 further includes a dispensing orifice means generally designated with the numeral 62 that is associated with the inflatable cavity 53 through the dispensing orifice means 62 and into the bearing 14 adjacent the rolling elements 20. More specifically the dispensing orifice means 62 includes one or more apertures 63 that are formed in the resilient wall 55 for dispensing the lubricating fluid from the lubricating fitting 10 to the bearing 14.

Figure 2:
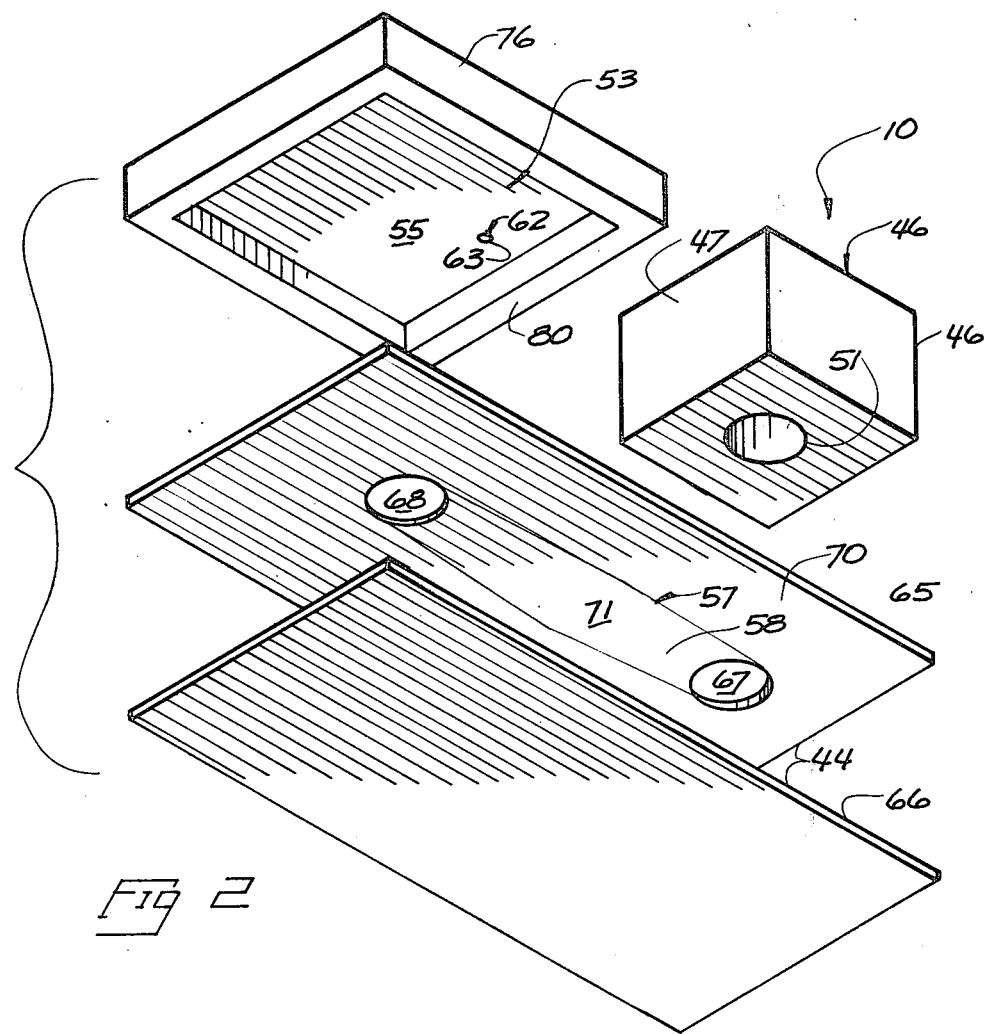
FIG. 2 is an expanded isometric view of the lubricating fittings showing the various components.

In the preferred embodiment (illustrated in FIGS. 1 and 2), the base 44 includes at least two elongated sheet elements 65 and 66 that extend between the lubricating supply section 42 and the lubricating application section 43. As part of the passge 58, apertures 67 and 68 are formed in the sheet element 65 at longitudinally spaced locations. The sheet elements 65 and 66 are laminated together to form an integral component in which the sheet elements are glued about a peripheral area 70 (FIG. 2). An internal unglued area or band 71 (FIG. 2) is provided between the apertures 67 and 68 to form passageway 58. Consequently the lubricating liquid such as grease will enter the aperture 67 and flow between the sheet elements 65 and 66 in the unglued area 71 to the aperture 68.

The lubrication application section 43 includes a low profile, cup-shaped resilient member 76 that is mounted to the base 44 overlying the aperture 68 to form the inflatable cavity 53. The resilient member 76 has a very low profile so that when mounted on the base 44, the combined thickness is slightly less than the thickness dimension of the confined space 37 so that the application section 43 may be easily slid in behind the wheel 11 to occupy the confined space 37. The resilient member 76 includes an extended face wall of surface 77 that forms the resilient wall 55 that is expandable outward from the base 44 for intimately engaging the wheel 11 along the outside 26 to form an annular seal 83 about the wheel rim 21 (FIG. 4). The resilient member 76 has a low profile peripheral side wall 80 that circumscribes the aperture 68. The orifice dispensing aperture 63 is formed in the extended face wall 77.

In a preferred configuration, the distance between the aperture 63 and the shoulder 47 corresponds to the radial distance from the rolling elements 20 to the wheel peripheral surface 23 so that the aperture 63 dispenses the grease into the bearing 14 adjacent the rolling elements 20.

Utilizing the lubricating fitting 10, maintenance personnel can easily lubricate all of the wheel bearings on an overhead door system within a few minutes. To lubricate conveyor wheel 11, the workman merely mounts the lubricating fitting 10 to a manual or automatic dispensing device containing pressurized lubricating fluid such as a grease gun. The lubricating fitting 10 is then inserted into the track channel 13 adjacent to the wheel 11 and then slid longitudinally with the lubrication application device 43 sliding into the confined space 37 behind the wheel 11 with the shoulder 47 resting against the wheel peripheral surface 23. Then the workman causes the grease to flow from the source into the fitting 10 with the grease passing through the source cavity 51 and passageway 58 into the inflatable cavity 53. The pressurized grease then expands inflatable cavity 53 causing the resilient wall 55 to move outwardly with the surface 77 bearing against the outside 26 of the wheel covering the hub 27 and forming an annular seal 83 against the wheel rim 21. The seal 83 prevents grease from flowing radially outward from the fitting 10. The aperture 63 is positioned substantially opposite the rolling element 20 so that the grease is dispensed efficiently and economically into the bearing 14. A bearing 14 can be lubricated in a few seconds without having to disassemble the conveyor.

The above described embodiment of this invention is merely illustrative of the principles of the invention and numerous other embodiments may be readily devised without deviating therefrom. Therefore, only the following claims are intended to define the scope of this invention.

What is claimed is:

1. Lubricating fitting for applying lubrication to a bearing of a conveyor track wheel that rides in a partially enclosed track channel in which the partially enclosed track channel forms a confined space of limited access between the track channel and a hub of the wheel, said lubricating fitting comprising:
   a body having a shape sufficient to slide along the track channel and fit into the confined space between the track channel and the wheel hub;
   said body having an inflatable cavity with a resilient wall that is expandable outwardly under fluid pressure;
   said body having means for receiving fluid lubrication under pressure from a lubrication source and communicating the fluid to the inflatable cavity to cause the resilient wall to expand outwardly and bear against and form an annular lubrication seal between the resilient wall and the wheel; and
   said resilient wall having a dispensing orifice means formed therein for enabling the fluid lubrication to effuse from the inflatable chamber through the dispensing orifice means and into the bearing.

2. The lubricating fitting as defined in claim 1 wherein the body has a lubrication application section including the inflatable cavity for projecting into the confined space and a lubrication supply section with a shoulder formed thereon to enable the body to be placed in the track channel with the shoulder of the lubrication supply section against a peripheral surface of the wheel and the lubrication application section extending into the confined space behind the wheel hub and the track channel.

3. The lubricating fitting as defined in claim 2 wherein the shoulder is spaced a prescribed distance from the dispensing means so that when the shoulder engages the peripheral surface of the wheel lubrication may be dispensed through the dispensing orifice directly onto rolling elements of the bearing.

4. The lubricating fitting as defined in claim 1 wherein the body included an elongated base with a passageway formed therein communicating with the means for receiving fluid lubrication and the inflatable cavity.

5. The lubricating fitting as defined in claim 4 wherein the fitting includes a low profile cup-shaped resilient member affixed to the base forming the inflatable cavity therebetween in which the resilient member has an extended surface that forms the resilient wall.

6. The lubricating fitting as defined in claim 4 wherein the base includes at least two sheet elements laminated together with the passageway formed therein.

7. The lubricating fitting as defined in claim 6 wherein one of the sheet elements includes two passageway apertures formed therein at longitudinal spaced locations with one aperture communicating with the inflatable cavity and the other apertures communicating with the means for receiving fluid lubrication.

8. The lubricating fitting as defined in claim 7 wherein the sheet elements are glued together leaving an unglued band extending between the passageway apertures in the one sheet element forming the passageway therebetween.

* * * * *